Figure 1:
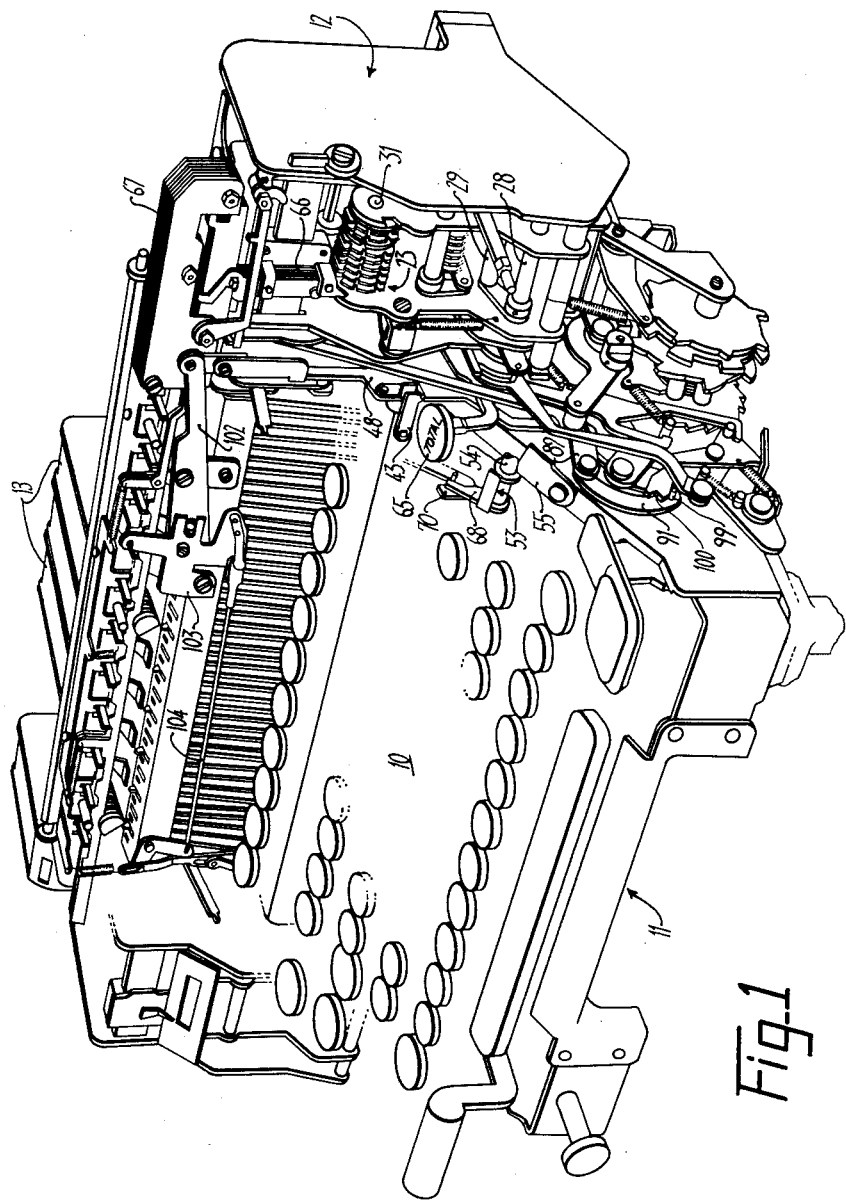

Oct. 10, 1961  E. L. WISE  3,003,686
CLEAR SIGN PRINTING MEANS FOR AN ACCOUNTING MACHINE
HAVING TRUE NEGATIVE TOTALIZATION
Filed Sept. 9, 1955  3 Sheets-Sheet 1

INVENTOR.
ELMER L. WISE
BY Jesse A. Holton
ATTORNEY

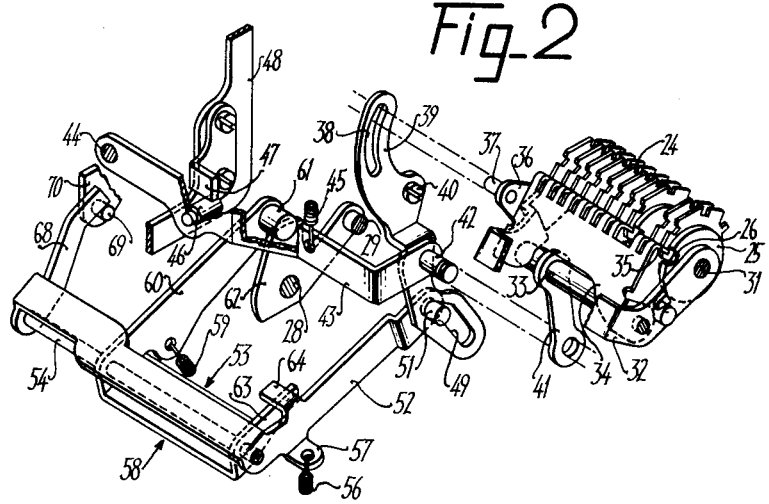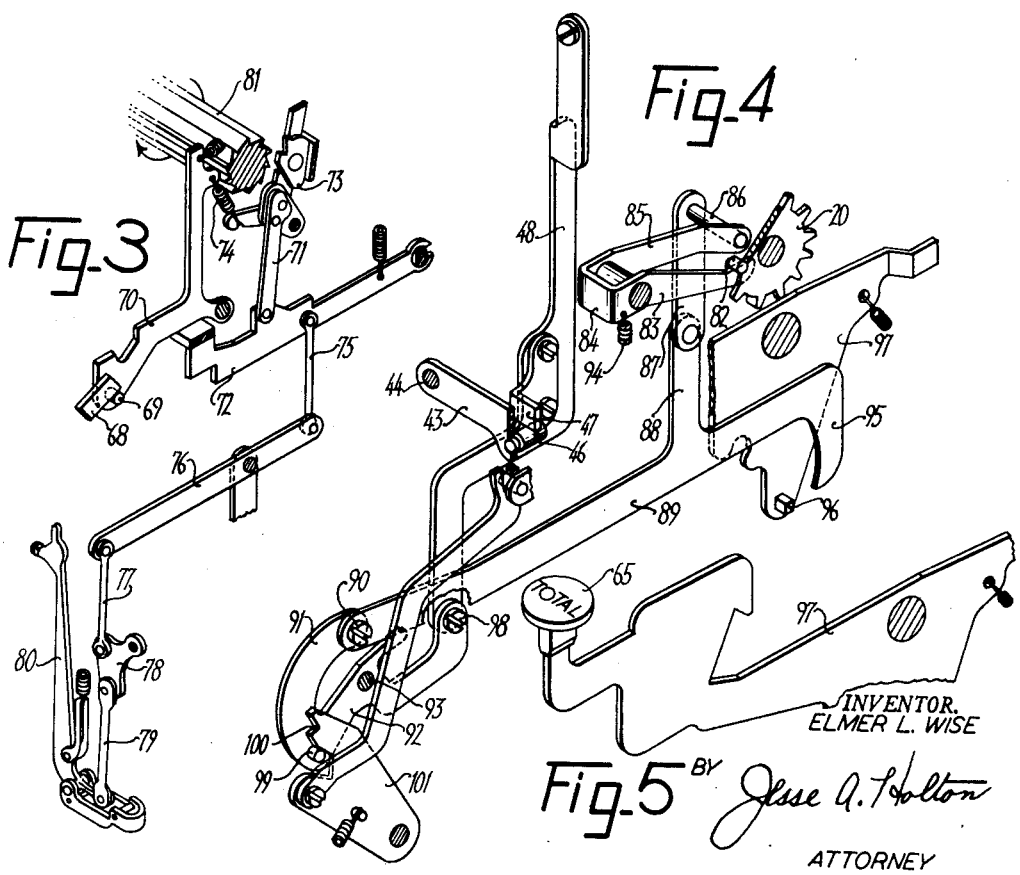

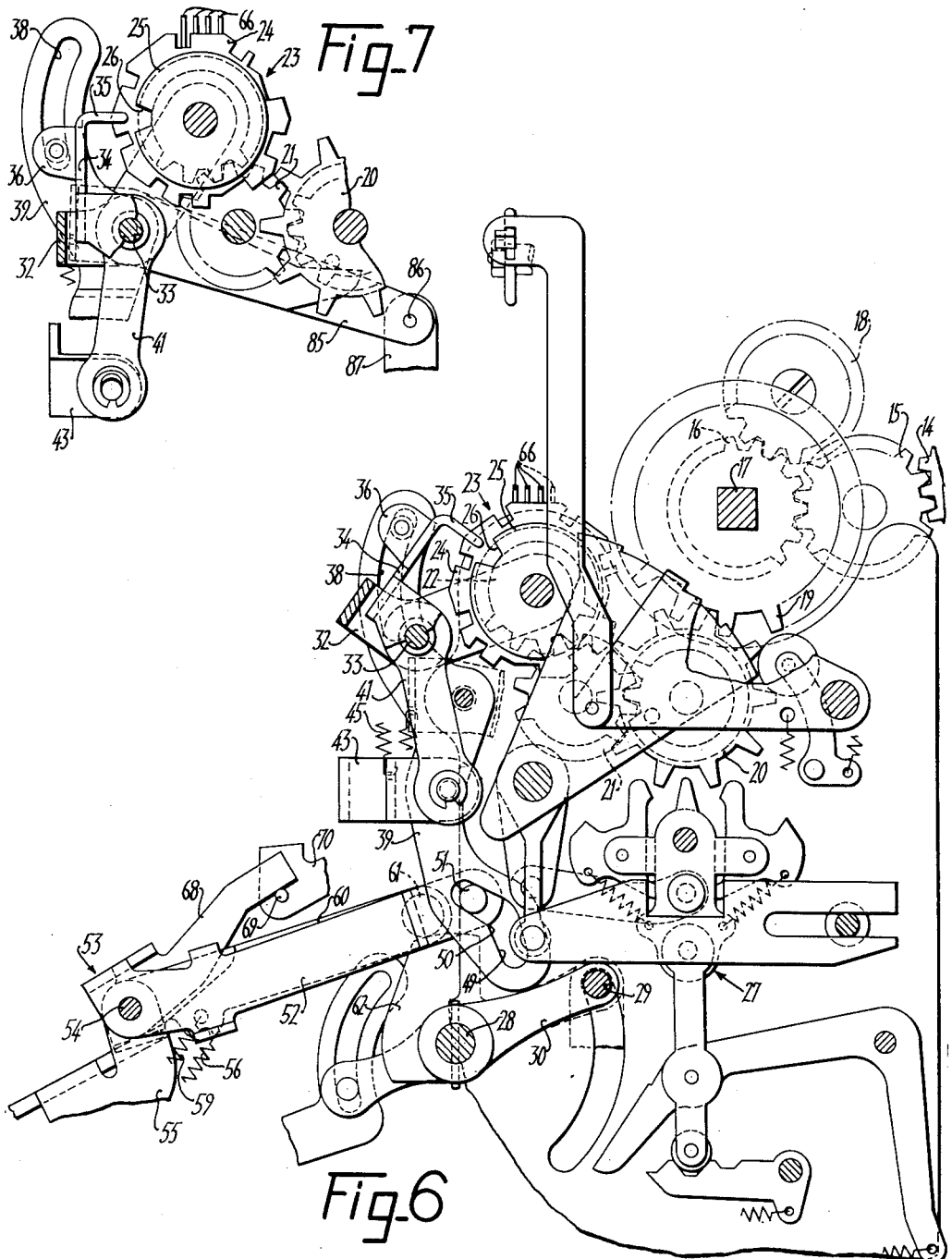

United States Patent Office 3,003,686
Patented Oct. 10, 1961

3,003,686
CLEAR SIGN PRINTING MEANS FOR AN ACCOUNTING MACHINE HAVING TRUE NEGATIVE TOTALIZATION
Elmer L. Wise, Farmington, Conn., assignor to Underwood Corporation, New York, N.Y., a corporation of Delaware
Filed Sept. 9, 1955, Ser. No. 533,309
7 Claims. (Cl. 235—60.17)

This invention relates to accounting machines of the type having a credit balance register or crossfooter from which an accumulated amount may be automatically printed and is concerned with an improved means for printing a distinctive symbol under control of the register whenever a total printing operation results in clearing the register.

To facilitate the sensing and printing of negative totals, machines adapted to print both positive and negaitve totals are usually provided with "fugitive one" mechanism which subtracts "one" from the lowest order register wheel when the register is operated from a positive condition to a negative condition and which adds "one" into the register when the register is operated from a negative condition to a positive condition. Thus, as is well understood by those familiar with accounting machines, instead of a negative amount being represented in the register as the complement of the true negative value, each denominational order wheel of the register stands at the "nines" complement and when a positive amount is added which is equal to the true negative amount already in the register, the wheels all turn to "nine."

Some accounting machines are so constructed that during all automatic total printing operations the register operates subtractively. With these machines, when a negative total is printed, the complement of the negative total or the individual "nines" complements of the various denominational orders in the case of a register having "fugitive one" mechanism, is subtracted from the register to thereby bring the register wheels to an all-zero condition. Other machines operate subtractively when a positive total is taken to thus turn the wheels back to zero and operate additively when taking a negative total to thereby bring the register wheels to an all-nine condition. It is with these latter machines that the present invention is concerned.

It is an object of this invention to provide an improved means for sensing both an all-zero and an all-nine condition of the wheels of a credit balance register of an accounting machine and for printing a distinctive symbol in response to the occurrence of such conditions.

A further object of the invention is to provide an accounting machine having improved means operable only upon a total taking operation for printing a distinctive symbol after the total when the total taking operation results in "clearing" the register, regardless of whether the register is "cleared" by addition or subtraction.

These and further objects, features and advantages of the invention will more fully appear as the description of a preferred embodiment thereof proceeds.

Referring now to the drawings:

FIGURE 1 is a perspective view of a portion of an accounting machine embodying the invention, with certain elements of the invention omitted for the sake of clarity, FIGURE 2 is an exploded perspective view showing the arrangement of certain of the elements of the invention, FIGURE 3 is a perspective view of the symbol printing mechanism, FIGURE 4 is a perspective view of certain of the elements employed in carrying out the invention and showing a portion of the "Total" key lever, FIGURE 5 is a perspective view of a portion of the "Total" key lever, FIGURE 6 is a side elevational view of the register and register operating mechanism, including the carryover and "fugitive one" mechanisms, and showing the clear condition sensing means in position for sensing an all-zero condition, and FIGURE 7 is a side elevational view of a portion of the mechanism shown in FIGURE 6 and showing the clear condition sensing means in position for sensing an all-nine condition.

The invention is illustrated as embodied in the well-known Elliott Fisher accounting machine such as described in the patent to Sundstrand, No. 2,625,324. As indicated in FIGURE 1, the machine comprises a typewriter keyboard 10 forming part of a letter-spaceable head 11 upon which is mounted a register or crossfooter generally designated at 12. The letter-spaceable head 11 is mounted upon a line-space frame, not shown, for movement over a flat platen, also not shown. Upon the line-space frame are mounted a plurality of column registers 13 for accumulating totals entered in vertical columns on a work sheet. Upon operation of the numeral keys of the keyboard, an amount is printed and run into one of the column registers and simultaneously entered additively or subtractively, depending upon whether it is a positive or negative amount, into the crossfooter. As explained in the above referred to Sundstrand patent, the machine is provided with means for sensing an amount in the crossfooter and operating the numeral type actions accordingly and, as the sensed amount is printed, the wheels of the crossfooter are turned to thereby clear the crossfooter of the printed amount. Presently the manner of operating the wheels of the crossfooter will be explained in some detail but at the outset it will be sufficient to mention that when a positive amount is extracted from the crossfooter during an automatic total taking operation the crossfooter wheels are all turned to "zero" and when a negative total is printed the wheels all turn to "nine."

A portion of the mechanism for operating the wheels of the crossfooting register is shown in FIGURE 6, to which figure attention is now directed. As described in the above referred to Sundstrand patent, a gear partially indicated at 14 is turned in a counterclockwise direction differential amounts from zero to nine whenever a numeral type action is operated while the head 11 is in the zone of one of the column registers 13. The gear 14 is constantly meshed with a gear 15 which latter is slidably mounted to engage either a gear 16 fixed to a rotatable square shaft 17 or an idler gear 18 engaged with the gear 16. Slidably mounted upon the shaft 17 is a so-called master wheel 19 which progresses denomination by denomination across the accumulator train of the crossfooter as an amount is entered, as explained in the above referred to patent to Sundstrand. Each denominational order accumulator train comprises a composite gear 20 having two rings of teeth which drives a pinion 21 which in turn is drivingly engaged with a gear 22 forming part of a register wheel generally designated 23. With the gear 15 engaged directly with the gear 16 the register wheels are driven additively in a clockwise direction and with the gear 15 engaged with the idler 18 the register wheels are rotated in a counterclockwise or subtractive direction.

The register wheels 23 each comprise a gear 22, a code disk 24 and a substantially circular disk 25 having an irregularity in the form of a notch 26 in its periphery. The gear 22 and disks 24 and 25 are secured together to rotate as a unit. In FIGURE 6 a register wheel 23 is shown in its "zero" position and in FIGURE 7 in its "nine" position.

As explained in the patent to Sundstrand, No. 2,573,508, the crossfooter is provided with carryover mechanism for adding or subtracting "one" in the next highest order register wheel when a register wheel moves from "9" to "0" or from "0" to "9" and with fugitive one mechanism for adding "one" in the lowest order wheel when the highest order wheel moves from "9" to "0" or subtracting "one" from the lowest order wheel when the highest order wheel moves from "0" to "9." Inasmuch as the details of the carryover and fugitive one mechanisms do not form a part of the present invention, they need not be described herein and are merely indicated generally in FIGURE 6 at 27. As explained in the Sundstrand patent No. 2,573,508, upon completion of the operation of the wheels 23, a shaft 28, see FIGURE 6, is rocked clockwise and a bar 29 carried by a pair of arms 30 secured to said shaft is swung downwardly about said shaft to restore the carryover mechanism to normal position. It will be understood that, because of the carryover and fugitive one mechanisms, when a negative amount is in the register, each denominational order wheel stands at the "9's" complement of the true negative value. Thus, if the register has five wheels, the wheels will stand at 99849 when indicating minus one hundred and fifty.

The register wheels 23 are rotatably mounted upon a shaft 31 and also mounted upon said shaft for limited pivotal movement, as will presently be explained, is a yoke member 32, best seen in FIGURE 2. A shaft 33 is mounted between opposite arms of the yoke member 32 and swingably mounted upon said shaft is a feeler member 34 having a plurality of fingers 35 adapted to extend into the notches 26 of the disks 25 when all the register wheels stand at "0" or at "9," as will be explained.

The feeler member 34 is provided with a bent-up tab 36 to which is fixed a pin 37. The pin 37 extends into an arcuate slot 38 provided in the upper end of a member 39 pivotally mounted upon the machine frame at 40.

A link 41 connects the shaft 33 to a pin 42 provided in the end of an arm 43 which is pivotally mounted upon the machine framework at 44. A spring 45 connected to the arm 43 normally holds said arm up in the position shown in FIGURE 2 with a pin 46 secured in said arm resting beneath a tab 47 provided upon a link 48. With the arm 43 in its up position, the yoke 32 is held up with the pin 37 of the feeler member 34 in the upper portion of the slot 38 and the fingers 35 aligned with the notches 26 of the disks 25 when the wheels 23 are in their "0" positions, as shown in FIGURE 6. When the register wheels 23 are in their "9" positions, the notches 26 are positioned as shown in FIGURE 7 and, as will be explained, under these circumstances, the link 48 is moved downward, whereupon the tab 47 depresses the arm 43 which in turn pulls down on the yoke 32 and lowers the feeler member 34 to the position shown in FIGURE 7 with the fingers 35 aligned with the notches 26.

At its lower end, the member 39 (see FIG. 6) is provided with a cam slot 49, said slot being divided by a shoulder 50 (see FIGURE 6) into two angularly disposed portions. A pin 51 provided on an arm 52 of a bail generally designated 53 is engaged within the slot 49 and serves at times to rock the member 39 in a clockwise direction, as will presently be explained. The bail 53 is pivotally mounted upon a rod 54 secured in a fixed bracket partially indicated at 55 in FIGURES 1 and 6, and is urged in a clockwise direction by a spring 56 secured at one end to a tab 57 provided upon the arm 52 and anchored at its other end to a stationary part of the machine.

A bail generally designated 58 is pivotally mounted upon the rod 54 and urged in a clockwise direction by a spring 59 extending between an arm 60 of said bail and a fixed anchor. The arm 60 is provided with a pin 61 which engages a cam member 62 secured to the hereinbefore mentioned shaft 28 and bar 29 and this engagement of the pin 61 with the cam 62 normally prevents the bail 58 from moving. An arm 63 of the bail 58 underlies an ear 64 provided on the arm 52 and normally retains the bail 53 in the position shown in the drawing.

As explained in the above referred to Sundstrand Patent No. 2,625,324, the machine is provided with automatic total printing means which becomes effective upon operation of a "Total" key 65. When the key 65 is operated, a series of feelers 66, see FIGURES 1, 6 and 7, sense the code disks 24 one at a time and, through a series of slides 67, numeral type actions are made effective in accordance with the digits sensed. As the type actions are operated the amount in the register is subtracted out if it is a positive amount to thereby bring the register wheels 23 to their "0" positions. If the amount in the register is a negative value, the register wheels are operated additively to bring the wheels to "9," as explained in the Patent No. 2,625,324 and as will presently be alluded to more particularly. After the last digit of the amount is printed, the master wheel 19 (see FIG. 6) moves one more step to the right as explained in the patent and at that time the shaft 28 is operated to restore the carryovers, as previously mentioned.

The mechanism of this invention is designed to print a distinctive symbol after the lowest order digit when an automatic total is taken provided the total taking operation actually results, as it should, in bringing the register wheels to an all "zero" or an all "nine" condition. In the case of a positive total, where the register wheels all turn to zero, the feeler member 34 is positioned as shown in FIGURE 6, as previously pointed out. As the shaft 28 rocks clockwise to restore the carryover mechanism, the cam member 62 (FIGURE 2) rocks clockwise to permit the arm 60 of bail 58 to move downward under the influence of the spring 59. This removes the arm 63 from beneath the ear 64 and the spring 56 thereupon becomes effective to rock the bail 53 in a clockwise direction. As the bail 53 rocks clockwise, the pin 51 moves down in the slot 49 and due to the contact of said pin with the shoulder 50 the member 39 is rocked clockwise to thereby swing the feeler member 34 in a clockwise direction. If the register wheels are all at zero, the notches 26 will be aligned with the fingers 35 and the feeler member 34 will rock far enough to permit the pin 51 to move all the way to the bottom of the slot 49. If one or more of the register wheels is not at zero, the spring 56 will be unable to swing the bail 53 far enough to move the pin 51 past the shoulder 50.

The bail 53 is provided with an arm 68 the end of which overlies a pin 69 provided on a type action key-lever 70. The key-lever 70 is not provided with a key because the type action actuated by said key-lever is the one which prints the distinctive symbol or "clear" sign and it is desirable that such symbol be printed only when an automatic total printing operation has been instituted. When the pin 51 moves to the bottom of the slot 49, the arm 68 presses down on the pin 69 and rocks the key-lever 70 in a counterclockwise direction as viewed in FIGURE 3.

The "clear" sign type action is like all the other non-numeric type actions and comprises an actuator 71 pivotally connected at its lower end to a lever 72 and carrying a pawl 73 connected by a spring 74 with an upstanding arm of the key-lever 70. The lever 72 is connected by a push-link 75 to one end of a pivotally mounted sub-lever 76 which is connected at its other end by a pull-link 77 to a pivotally mounted bell crank 78. The bell crank 78 is connected by a link 79 to a pivotally mounted type bar 80. Upon depression of the pin 69 as aforesaid, the pawl 73 is moved into engagement with a continuously rotating toothed shaft 81 and through the system of links and levers the type bar is swung downward to engage its distinctive type with the work sheet.

Referring now to FIGURE 4, a gear 20 arranged between the register side wall and the gear of the highest order of the accumulator train is provided with a pin 82 that extends through a slot (not shown) in the register side wall, said gear being limited in movement by said slot to the "0" or the "9" position, as is customary in machines of this character. As the highest order register wheel is moved from "0" to "9," as when the register goes to a credit balance condition, said pin depresses an arm 83 of a pivotally mounted bail member 84. An arm 85 of the bail member 84 is pivotally connected by a pin 86 to the upper end of a link 87 the lower end of which is pivotally connected to an arm 88 of a member 89. The member 89 is pivotally connected at 90 to an arm 91 of a rockable member 92 pivoted on the framework at 93. A spring 94 connected to the bail member 84 normally holds the right hand end of the member 89 up so that a downward extension 95 thereof is out of the path of movement of a stud 96 provided upon a key-lever 97 carrying the "Total" key 65. When the pin 82 depresses the arm 83, the right hand end of the member 89 is lowered so that the extension 95 will be struck by the stud 96 upon subsequent operation of the "Total" key. When the stud 96 contacts the extension 95 the member 89 is moved toward the right as viewed in FIGURE 4 to rock the member 92 in a clockwise direction. The member 92 is pivotally connected at 98 to the lower end of the hereinbefore mentioned link 48 and thus said link is pulled down when the "Total" key is depressed at a time when the register contains a credit balance.

When the member 92 is rocked clockwise, a pin 99 thereon becomes positioned over a shoulder 100 of a latch member 101 to thus hold said member in rocked condition even though the operator releases the "Total" key. As explained in the patent to Sundstrand No. 2,625,324, the latch member is released when the total taking operation is completed. As also explained in the Sundstrand Patent No. 2,625,324, the upper end of the link 48 is connected, through a series of levers 102 and 103, a link 104, see FIGURE 1, and other links and levers not shown, to the gear 15 and when the link 48 is drawn down the gear 15 is engaged with the gear 16 and thus conditions the crossfooter to operate additively when the amount in the crossfooter is a negative amount.

As previously explained, when the link 48 is moved downward, the tab 47 thereon depresses the arm 43 which positions the feeler fingers 35 in alignment with the "nine" position of the register wheel notches 26, as shown in FIGURE 7. The operation of the feeler member 34 is the same when "9's" are to be sensed as when "0's" are to be sensed, which latter operation has previously been explained.

Having thus described a preferred embodiment of the invention, what is claimed is:

1. In an accounting machine, a credit balance register comprising a plurality of axially aligned wheels, means for entering amounts additively and subtractively into said register, means for sensing and printing a total accumulated in said register, a key for instituting operation of said last named means, means for turning the wheels of said register to a "zero" position when a positive total is printed and for turning said wheels to a "nine" position when a negative total is printed, a substantially circular disk forming an integral part of each register wheel, an irregularity in the periphery of each disk, a feeler member normally disengaged from said disks and adapted to sense said irregularities, means including said key for shifting said feeler member during a negative total-taking operation from a position wherein said member is aligned with said irregularities when the register wheels stand at "zero" to a position wherein said member is aligned with said irregularities when said register wheels stand at "nine," operating means for causing said feeler member to sense said irregularities, and printing means actuated by said operating means for printing a distinctive symbol when said feeler member senses all of said irregularities.

2. In an accounting machine, a credit balance register comprising a plurality of axially aligned wheels, means for entering amounts additively and subtractively into said register, means for sensing and printing a total accumulated in said register, a "Total" key for instituting operation of said last named means, means for turning the wheels of said register to a "zero" position when a positive total is printed and for turning said wheels to "nine" when a negative total is printed, a substantially circular disk forming an integral part of each register wheel, a notch in the periphery of each disk, a feeler member having a plurality of fingers which are normally disengaged from said disks, a pivotal mounting for said feeler member, means including said "Total" key for shifting said pivotal mounting during a negative total-taking operation from a first position wherein said fingers are aligned with said notches when said register wheels are in their "zero" positions to a second position wherein said fingers are aligned with said notches when said wheels are in their "nine" positions, operating means for swinging said feeler member from said disk disengaged position about its pivotal mounting to engage the fingers thereof with said notches in said disks, and printing means actuated by said operating means for printing a distinctive symbol when said fingers enter all of said notches.

3. In an accounting machine, a credit balance register comprising a plurality of axially aligned wheels, means for entering amounts additively and subtractively into said register, means for sensing and printing a total accumulated in said register, means for turning the wheels of said register to a "zero" position when a positive total is printed and for turning said wheels to a "nine" position when a negative total is printed, a substantially circular disk forming an integral part of each register wheel, an irregularity in the periphery of each disk, a feeler member adapted to sense said irregularities, shifting means for shifting said feeler member from a position wherein said feeler member is aligned with said irregularities when said register wheels are in their "zero" positions to a second position wherein said feeler member is aligned with said irregularities when said wheels are in their "nine" positions, means for shifting said shifting means, means operable by movement in a subtractive direction of the highest order register wheel from "zero" to "nine" to condition said shifting means for operation, cyclic operating means normally holding said feeler member out of engagement with said disks, said operating means causing said feeler member to sense said irregularities during said cyclic operation, and printing means actuated by said operating means for printing a distinctive symbol when said feeler member senses all of said irregularities.

4. In an accounting machine, a credit balance register comprising a plurality of axially aligned wheels, means for entering amounts additively and subtractively into said register, means for sensing and printing a total accumulated in said register, a "Total" key for instituting operation of said last named means, means for turning the wheels of said register to a "zero" position when a positive total is printed and for turning said wheels to a "nine" position when a negative total is printed, a substantially circular disk forming an integral part of each register wheel, an irregularity in the periphery of each disk, a feeler member normally adapted in non-abutting relationship with said disks and adapted to sense said irregularities, said feeler member being shiftable by operation of said "Total" key whenever the highest order register wheel has turned in a subtractive direction from a "zero" position to a "nine" position, said feeler member being shiftable by said "Total" key from a position for sensing said irregularities when the register wheels are at "zero" to a position for sensing said irregularities when said wheels are at "nine," cyclic operating means for said feeler member, and printing means actuated by said operating means for printing a distinctive symbol when said feeler member senses all of said irregularities.

5. In an accounting machine, a credit balance register comprising a plurality of axially aligned wheels, means for entering amounts additively and subtractively into said register, means for sensing and printing a total accumulated in said register, a "Total" key for instituting a total printing operation, means for turning the wheels of said register to a "zero" position when a positive total is printed and for turning said wheels to a "nine" position when a negative total is printed, a substantially circular disk forming an integral part of each register wheel, a notch in the periphery of each disk, a feeler member, a pivotal mounting for said feeler member, said pivotal mounting being movable from a first position wherein said feeler member is aligned with said notches and clear of said disks when said register wheels are in their "zero" positions to a second position wherein said feeler member is aligned with said notches and clear of said disks when the register wheels are in their "nine" positions, means operable by said "Total" key when the highest order register wheel has turned in a subtractive direction from "zero" to "nine" to move said pivotal mounting from its first position to its second position, cyclically responsive means for swinging said feeler member about its pivotal mounting to engage said member with said notches, and printing means actuated by said last named means for printing a distinctive symbol.

6. In an accounting machine, a credit balance register comprising a plurality of axially aligned wheels, means for entering amounts additively and subtractively into said register, means for sensing and printing a total accumulated in said register, a "Total" key for instituting a total printing operation, means for turning the wheels of said register to a "zero" position when a positive total is printed and for turning said wheels to a "nine" position when a negative total is printed, a substantially circular disk forming an integral part of each register wheel, a notch in the periphery of each disk, a feeler member having a plurality of fingers, said fingers normally spaced from said disks, a pivotal mounting for said feeler member, said pivotal mounting being movable from a first position wherein said fingers are aligned with said notches when said register wheels are in their "zero" positions to a second position wherein said fingers are aligned with said notches when the register wheels are in their "nine" positions, means operable by said "Total" key when the highest order register wheel has turned in a subtractive direction from "zero" to "nine" to move said pivotal mounting from its first position to its second position, cyclically responsive means for swinging said feeler member about its pivotal mounting to engage the fingers thereof with said notches, and printing means actuated by said last named means for printing a distinctive symbol when said fingers enter all of said notches.

7. In an accounting machine, a credit balance register comprising a plurality of axially aligned wheels, means for entering amounts additively and subtractively into said register, means for sensing and printing a total accumulated in said register, a "Total" key for instituting a total printing operation, means for turning the wheels of said register to a "zero" position when a positive total is printed and for turning said wheels to a "nine" position when a negative total is printed, a substantially circular disk forming an integral part of each register wheel, a notch in the periphery of each disk, a feeler member, a pivotal mounting for said feeler member, normally ineffective shifting means for shifting said pivotal mounting from a first position wherein said feeler member is aligned with said notches and free of said disks when said register wheels are in their "zero" positions to a second position wherein said feeler member is aligned with said notches and free of said disks when said wheels are in their "nine" positions, means operable by movement in a subtractive direction of the highest order register wheel from "zero" to "nine" to condition said shifting means for operation by said "Total" key, means operable upon operation of said "Total" key for shifting said shifting means, cyclically responsive operating means for causing said feeler member to sense said notches, and printing means actuated by said operating means for printing a distinctive symbol when said feeler member senses all of said notches.

UNITED STATES PATENTS

References Cited in the file of this patent

| | | |
|---|---|---|
| 989,353 | Harrison | Apr. 11, 1911 |
| 1,490,129 | Poole | Apr. 15, 1924 |
| 2,428,084 | Lambert | Sept. 30, 1947 |
| 2,473,738 | Thierfelder | June 21, 1949 |
| 2,625,324 | Sundstrand | Jan. 13, 1953 |
| 2,655,311 | Pitman | Oct. 13, 1953 |
| 2,665,063 | Frieberg et al. | Jan. 5, 1954 |